(12) United States Patent
Cohen et al.

(10) Patent No.: US 11,463,339 B2
(45) Date of Patent: Oct. 4, 2022

(54) DEVICE AND METHOD FOR DELIVERING ACKNOWLEDGMENT IN NETWORK TRANSPORT PROTOCOLS

(71) Applicant: Huawei Technologies Co., Ltd., Shenzhen (CN)

(72) Inventors: Reuven Cohen, Hod Hasharon (IL); Ben-Shahar Belkar, Hod Hasharon (IL); Tal Mizrahi, Hod Hasharon (IL); Dima Ruinskiy, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/324,986

(22) Filed: May 19, 2021

(65) Prior Publication Data
US 2021/0385147 A1 Dec. 9, 2021

Related U.S. Application Data

(63) Continuation of application No. PCT/EP2020/065614, filed on Jun. 5, 2020.

(51) Int. Cl.
*H04L 43/103* (2022.01)
*H04L 47/127* (2022.01)
(Continued)

(52) U.S. Cl.
CPC .......... *H04L 43/103* (2013.01); *H04L 47/115* (2013.01); *H04L 47/127* (2013.01); *H04L 47/27* (2013.01)

(58) Field of Classification Search
CPC ... H04L 43/103; H04L 47/115; H04L 47/127; H04L 47/27
(Continued)

(56) References Cited

U.S. PATENT DOCUMENTS 6,173,323 B1 * 1/2001 Moghe .................... H04L 43/10
340/10.5
6,697,331 B1 2/2004 Riihinen et al.
(Continued)

OTHER PUBLICATIONS

"Broadband ISDN; B-ISDN ATM Adaptation Layer-Service Specific Connection Oriented Protocol (SSCOP)," ITU-T Recommendation Q.2110, total 99 pages, International Telecommunication Union (Jul. 1994).
(Continued)

*Primary Examiner* — James E Springer
*Assistant Examiner* — Patrick F Ngankam
(74) *Attorney, Agent, or Firm* — Leydig, Voit & Mayer, Ltd.

(57) ABSTRACT

A first network device is configured to: transmit data packets and poll messages to a second network device; and receive, in response to each poll message, at least one status message from the second network device. The at least one status message indicates which of the data packets sent before that poll message have been correctly received at the second network device and/or have been lost. The first network device is configured to adapt a rate of transmitting the poll messages based on a set of parameters. Further, a second network device is configured to: receive data packets from a first network device; and transmit at least one unsolicited status message to the first network device, in case of certain conditions.

19 Claims, 10 Drawing Sheets

(51) Int. Cl.
*H04L 47/27* (2022.01)
*H04L 47/11* (2022.01)

(58) Field of Classification Search
USPC .......................................................... 709/230
See application file for complete search history.

(56) References Cited

U.S. PATENT DOCUMENTS

| | | | |
|---|---|---|---|
| 2006/0268812 A1* | 11/2006 | Wilson .................. | H04W 28/18 370/346 |
| 2010/0023832 A1 | 1/2010 | Mate et al. | |
| 2012/0239808 A1* | 9/2012 | Davis .................. | G08B 25/009 709/224 |
| 2016/0150433 A1* | 5/2016 | Bergquist .............. | H04W 74/06 370/328 |
| 2018/0146391 A1* | 5/2018 | Bergquist .............. | H04L 1/1887 |
| 2019/0245638 A1 | 8/2019 | Cayla et al. | |
| 2020/0154306 A1* | 5/2020 | Jeon ...................... | H04L 1/1685 |

OTHER PUBLICATIONS

"3rd Generation Partnership Project; Technical Specification Group Radio Access Network; Radio Link Control (RLC) protocol specification (Release 15)," 3GPP TS 25.322 V15.0.0, total 90 pages, 3rd Generation Partnership Project, Valbonne, France (Jun. 2018).

* cited by examiner

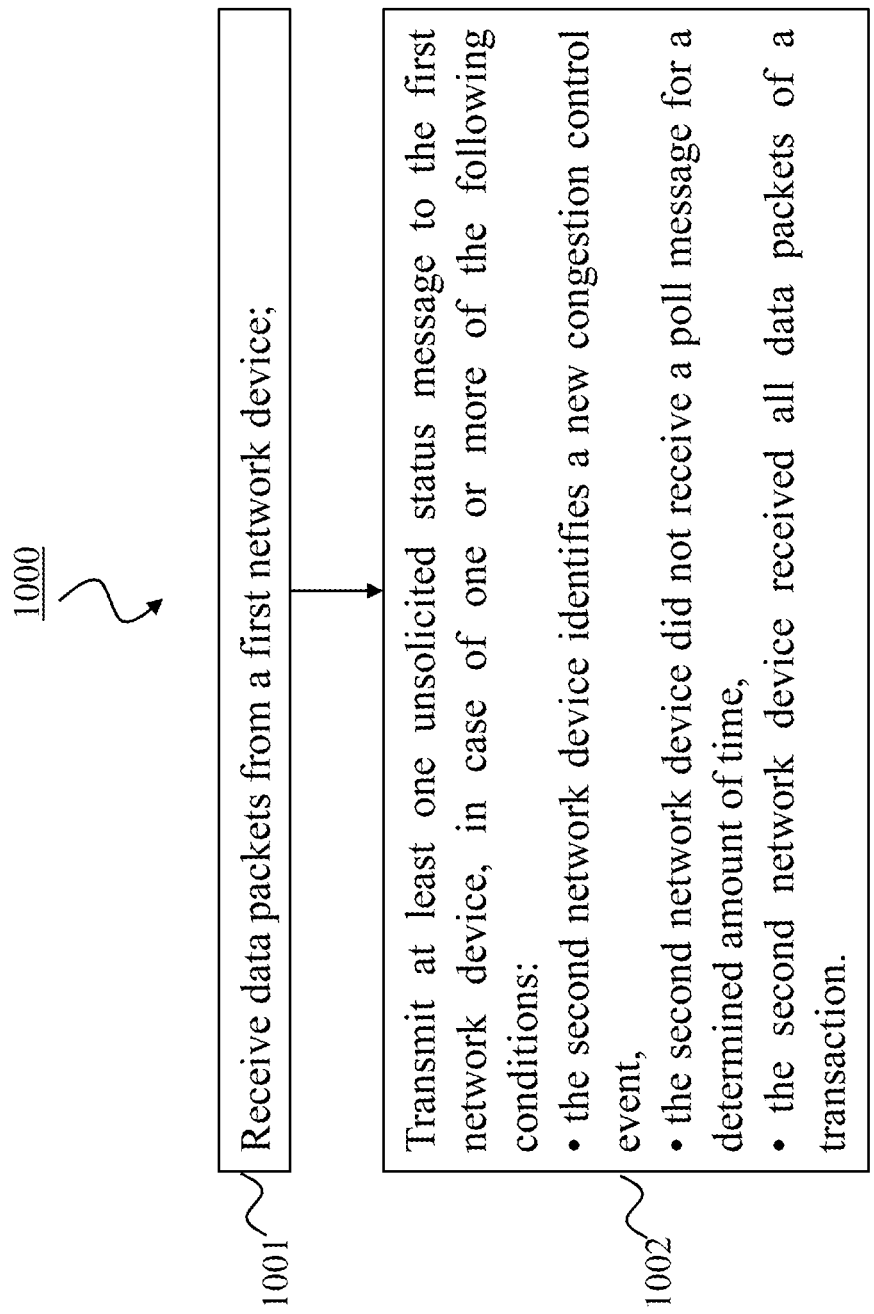

DEVICE AND METHOD FOR DELIVERING ACKNOWLEDGMENT IN NETWORK TRANSPORT PROTOCOLS

CROSS-REFERENCE TO RELATED APPLICATIONS

This application is a continuation of International Application No. PCT/EP2020/065614, filed on Jun. 5, 2020, the disclosure of which is hereby incorporated by reference in its entirety.

TECHNICAL FIELD

The present disclosure relates to communication networks, and more particularly to data reliability in data transmission of communication networks.

BACKGROUND

In data networks, when two computers communicate with each other, it is often necessary to ensure data reliability. To this end, the sender attaches a sequence number to each data-packet, and the receiver informs the sender which data-packets have been received and which data-packets are missing. The sender must retransmit the missing data-packets until the receiver receives all data-packets.

Protocols for ensuring data reliability can be classified into three main categories: Stop-and-Wait, go-back-N, and Selective-Repeat.

In Stop-and-Wait, the sender sends the packet and waits for the ACK (acknowledgement) of the packet. Once the ACK reaches the sender, it transmits the next data packet. If the ACK is not received, it re-transmits the previous data packet again.

In go-back-N, a receiver that has received all data packets up to packet number N is willing to accept only packet number N+1. If packet N+1 is not received, but a packet with a higher sequence number is received, e.g., N+2, the receiver drops this out-of-order packet. When the sender is informed that data packet N+1 was lost, it knows that it must retransmit not only this data packet, but also all succeeding packets. Stop-and-wait is actually a special case of go-back-N, with N=1.

In Selective-Repeat, the receiver is willing to accept packets that are received out of order. The receiver places these packets in a reordering buffer. It then informs the sender only about missing packets, and the sender retransmits only the missing packets.

However, the existing solutions are only applied to Layer 2 networks, in which the delay is constant and packets are delivered in order.

SUMMARY

In view of the above-mentioned limitations, aspects of the disclosed embodiments introduce a dynamic solution for ensuring data reliability. In particular, embodiments provide a generalized protocol for ensuring data reliability and making it applicable to larger networks. One aspect of embodiments of the disclosure is to allow that the protocol can be efficiently used in modern datacenters.

Embodiments of the disclosure contributes in two exemplary aspects. In particular, aspects of the disclosed embodiments provide dynamic approaches for sending poll messages. In addition, aspects of the disclosed embodiments also provide dynamic approaches for sending status messages.

A first aspect of the disclosed embodiments provides a first network device, which is configured to: transmit data packets to a second network device; transmit poll messages to the second network device; and receive, in response to each poll message, at least one status message from the second network device, the at least one status message indicating which of the data packets sent before that poll message have been correctly received at the second network device and/or have been lost; wherein the first network device is configured to adapt a rate of transmitting the poll messages based on a set of parameters.

The first network device (sender), by being configured to adapt the rate of transmitting the poll messages, provides a dynamic solution for ensuring data reliability. In particular, this ensures data reliability and is applicable to larger networks.

In an implementation form of the first aspect, the first network device is configured to adapt the rate of transmitting the poll messages by performing a deterministic and/or probabilistic algorithm based on the set of parameters.

This is in contrast to algorithms used in the state of art, which are typically deterministic. The first network device may use either deterministic or probabilistic considerations. In a probabilistic algorithm, the first network device can decide whether or not to send a poll message using probabilistic considerations.

In an implementation form of the first aspect, the first network device is configured to decide whether to transmit a poll message after a given transmitted data packet based on the set of parameters.

Optionally, the first network device may decide whether or not to send the poll message, particularly after a certain data packet, using probabilistic considerations.

In an implementation form of the first aspect, the set of parameters comprises a probability parameter.

For instance, a probabilistic algorithm may be to send a poll message after each data packet with probability p.

In an implementation form of the first aspect, the set of parameters comprises a congestion parameter indicating a network congestion.

Notably, in modern datacenters, almost all missing packet events are attributed to network congestions. Thus, a relationship between a rate of transmitting the poll messages and a network congestion may also be considered.

In an implementation form of the first aspect, the set of parameters comprises a round trip time (RTT) between the first network device and the second network device.

Notably, the RTT is the length of time it takes for a signal to be sent plus the length of time it takes for an ACK of that signal to be received.

In an implementation form of the first aspect, the first network device is configured to: increase the rate of transmitting the poll messages, if the congestion parameter indicates a high network congestion; and/or decrease the rate of transmitting the poll messages, if the congestion parameter indicates a low network congestion.

It can be seen that, when there is high congestion, there are many lost packets, Thus, the first network device may increase the rate of sending poll messages. On the other hand, when there is low congestion, the first network device may decrease the rate of sending poll messages.

In an implementation form of the first aspect, the first network device is configured to adapt the rate of transmitting the poll messages proportionally to a network congestion along the transmission path between the first and the second network device.

In an implementation form of the first aspect, the set of parameters comprises a first proximity parameter indicating a proximity of the transmitted data packets to the end of a transaction, wherein the transaction comprises a plurality of data packets.

Notably, it may be more important for the first network device to be aware of lost packets, when it is close to the end of a transaction, compared to when it is far from the end of the transaction. Preferably, this information should also be considered when adapting the rate of transmitting poll messages.

In an implementation form of the first aspect, the first network device is configured to increase the rate of transmitting the poll messages, if the first proximity parameter indicates that the data packets are transmitted close to the end of the transaction.

This allow enhanced awareness of lost packets when being close to the end of a transaction, and the poll messages may be transmitted with a higher rate.

In an implementation form of the first aspect, the set of parameters comprises a second proximity parameter indicating a proximity of the transmitted data packets to the end of a transmission window of the first network device.

In an implementation form of the first aspect, the first network device is configured to increase the rate of transmitting the poll messages, if the second proximity parameter indicates that the data packets are transmitted close to the end of the transmission window.

That is, more poll messages will be sent when the first network device is closer to the end of its window.

In an implementation form of the first aspect, the poll messages are transmitted piggybacked onto the data packets to the second network device.

Optionally, the poll messages may not have to be separate messages, may instead be piggybacked onto data packets.

A second aspect of the disclosed embodiments provides a second network device, which is configured to receive data packets from a first network device; and transmit at least one unsolicited status (USTAT) message to the first network device, in case of one or more of the following conditions: the second network device identifies a new congestion control event, the second network device did not receive a poll message for a determined amount of time, the second network device received all data packets of a transaction.

The second network device (receiver) may use the USTAT messages for conveying important information to the first transmitting device (sender), and particularly not only when a new sequence number gap is detected, but also in other situations.

In an implementation form of the second aspect, the second network device is further configured to transmit at least one USTAT message to the first network device, if detecting that one or more data packets were not received.

In an implementation form of the second aspect, the congestion control event comprises a network congestion along the transmission path between the first and the second network device.

For example, even if the second network device receives a data packet correctly, but this packet indicates that one of the switches along the path was congested, this information may be provided to the first network device.

In an implementation form of the second aspect, if the second network device did not receive a poll message for the determined amount of time, the second network device is configured to include a maximum sequence number of data packets received in order in the at least one USTAT message.

In an implementation form of the second aspect, if the second network device did not receive a poll message for the determined amount of time, the second network device is configured to include packets acceptance information, which indicates the status of one or more packets that were received and/or one or more packets that were not received, in the at least one USTAT message.

Optionally, a USTAT message can report not only about maximum sequence number of data packets received in order, but also to send packets acceptance information that indicates the status of which packet has been received and which is missing. For instance, the packets acceptance information could comprise a bitmap, a table or any other possible way that can indicate whether each packet is received.

A third aspect of the disclosed embodiments provides a method performed by a first network device, wherein the method comprises transmitting data packets to a second network device; transmitting poll messages to the second network device; and receiving, in response to each poll message, at least one status message from the second network device, the at least one status message indicating which of the data packets sent before that poll message have been correctly received at the second network device and/or have been lost; wherein the first network device is configured to adapt a rate of transmitting the poll messages based on a set of parameters.

Implementation forms of the method of the third aspect may correspond to the implementation forms of the first network device of the first aspect described above. The method of the third aspect and its implementation forms achieve the same advantages and effects as described above for the first network device of the first aspect and its implementation forms.

A fourth aspect of the disclosed embodiments provides a method performed by a second network device, wherein the method comprises: receiving data packets from a first network device; and transmitting at least one USTAT message to the first network device, in case of one or more of the following conditions: the second network device identifies a new congestion control event, the second network device did not receive a poll message for a determined amount of time, the second network device received all data packets of a transaction.

Implementation forms of the method of the fourth aspect may correspond to the implementation forms of the second network device of the second aspect described above. The method of the fourth aspect and its implementation forms achieve the same advantages and effects as described above for the second network device of the second aspect and its implementation forms.

A fifth aspect of the disclosed embodiments provides a computer program product comprising a program code for carrying out, when implemented on a processor, the method according to the third aspect and any implementation forms of the third aspect, or the fourth aspect and any implementation forms of the fourth aspect.

It has to be noted that all devices, elements, units, and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the disclosure will be explained in the following description of exemplary embodiments in relation to the enclosed drawings, in which
FIG. 10 shows a method according to an embodiment.

DETAILED DESCRIPTION

Illustrative embodiments of methods, devices, and program products for efficient packet transmission in a communication system are described with reference to the figures. Although this description provides exemplary examples of possible implementations, it should be noted that the details are intended to be illustrative and in no way limit the scope of the application.

Moreover, an embodiment/example may refer to other embodiments/examples. For example, any description including, but not limited to, a terminology, element, process, explanation, and/or technical advantage mentioned in one embodiment/example is applicative to the other embodiments/examples.

Protocols for ensuring data reliability can be classified into three main categories: Stop-and-Wait, go-back-N and Selective-Repeat.

For example, a sender sends packets 1-5, and only packet number 3 is lost. In a go-back-N scenario, the sender will retransmit packets 3-5, while in a Selective-Repeat scenario, the sender will retransmit only packet number 3.

Figure 1:
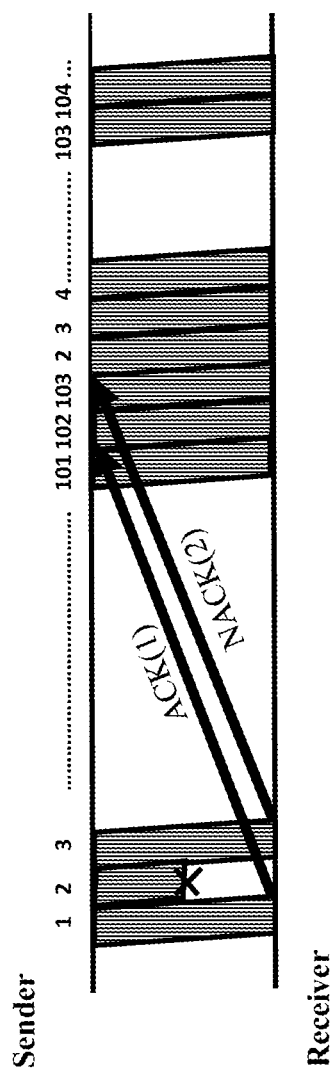
FIG. 1 shows an example of go-back-N approach.

FIG. 1 shows a case where in go-back-N, the sender sends 103 packets before it is informed by a NACK that packet 2 is missing. It therefore must retransmit not only packet 2, but also packets 3-103. Only after that, the sender can continue transmitting new packets (from 104 and up).

Figure 2:
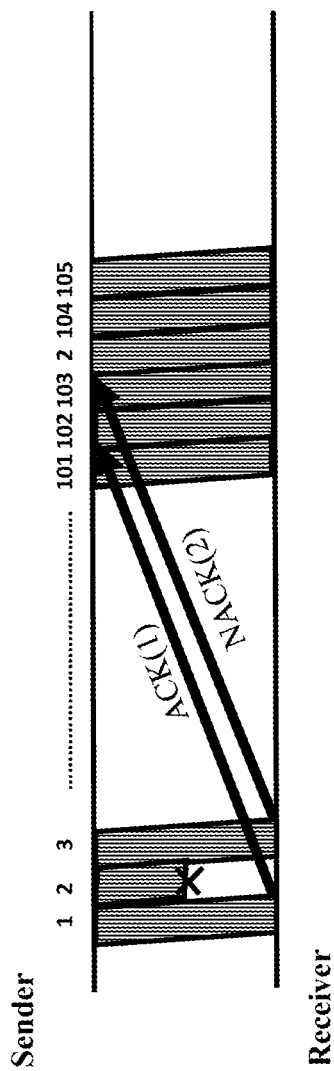
FIG. 2 shows an example of Selective-Repeat approach.

An example depicted in FIG. 2 shows a similar situation, but with Selective-Repeat. Here, when the sender is informed that packet number 2 is missing, it retransmits only this packet (i.e., packet number 2), and then it can continue transmitting new packets.

Notably, Selective-Repeat is a more efficient protocol, since only packets that fail to reach the receiver are retransmitted. However, the implementation of Selective-Repeat is more difficult than that of go-back-N, for two main reasons. The first is that Selective-Repeat requires the receiver to store out-of-order packets in a special buffer until missing packets are received (it cannot deliver to the application out of order packets). The second is that informing the sender, which packets have been received and which are missing, is a difficult task in an asynchronous and unreliable network. In particular, it is possible that the receiver informs the sender that a packet is missing while a (re)transmission of this packet will reach the receiver quite soon. Thus, a Selective-Repeat sender always has the difficulty of deciding whether or not to obey a retransmission request.

Figure 3:
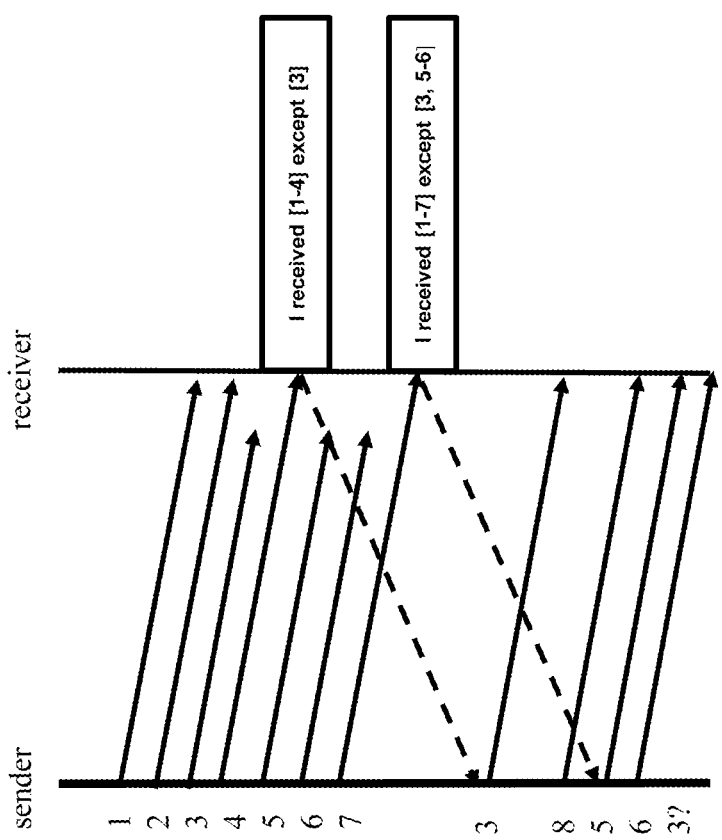
FIG. 3 shows an ambiguity problem of Selective-Repeat approach.

For example, a situation is as shown in FIG. 3. In particular, after receiving packet 4, the receiver understands that packet 3 is lost, because if it was not lost it should have been received before packet 4. The receiver needs to inform the sender. It could send a negative ACK (NACK), optionally the receiver may inform the sender about all the packets it has received and the packet it has not received. This message may be named as ACK/NACK.

When the sender receives this ACK/NACK message, it retransmits packet number 3. But sometime later it receives another ACK/NACK, which indicates that packets 5-6 are also lost. This ACK/NACK also informs that packet 3 is (still) missing. When the sender receives this ACK/NACK, it does not know what is the status of the retransmitted copy of packet 3. On one hand, if it ignores the fact that this ACK/NACK indicates that packet 3 is (still) missing, then it would never be able to know that the retransmitted copy of packet 3 is lost. On the other hand, if it retransmits packet 3 once again, but the previous retransmission was received by the receiver, then this second retransmission is a waste of resources.

Figure 4:
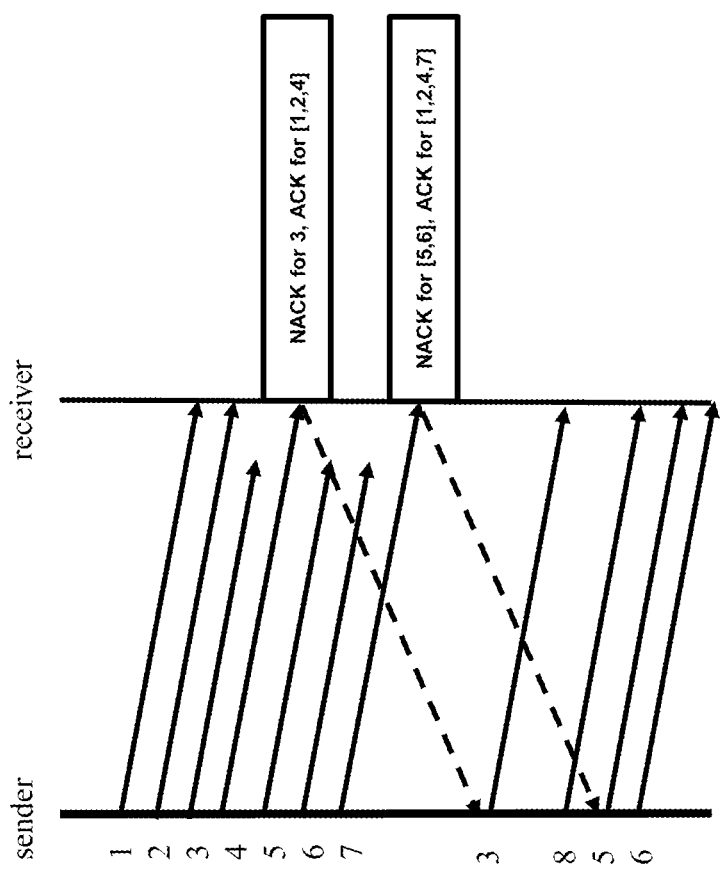
FIG. 4 shows an example of Selective-Repeat approach.

One way to address the above "ACK/NACK" ambiguity is that each ACK/NACK reports every lost packet only once, and also says what packets have been correctly received by the receiver. FIG. 4 shows the situation that the sender sending a NACK only for a new gap. Notably, a gap occurs when the packets are not contiguous.

Figure 5:
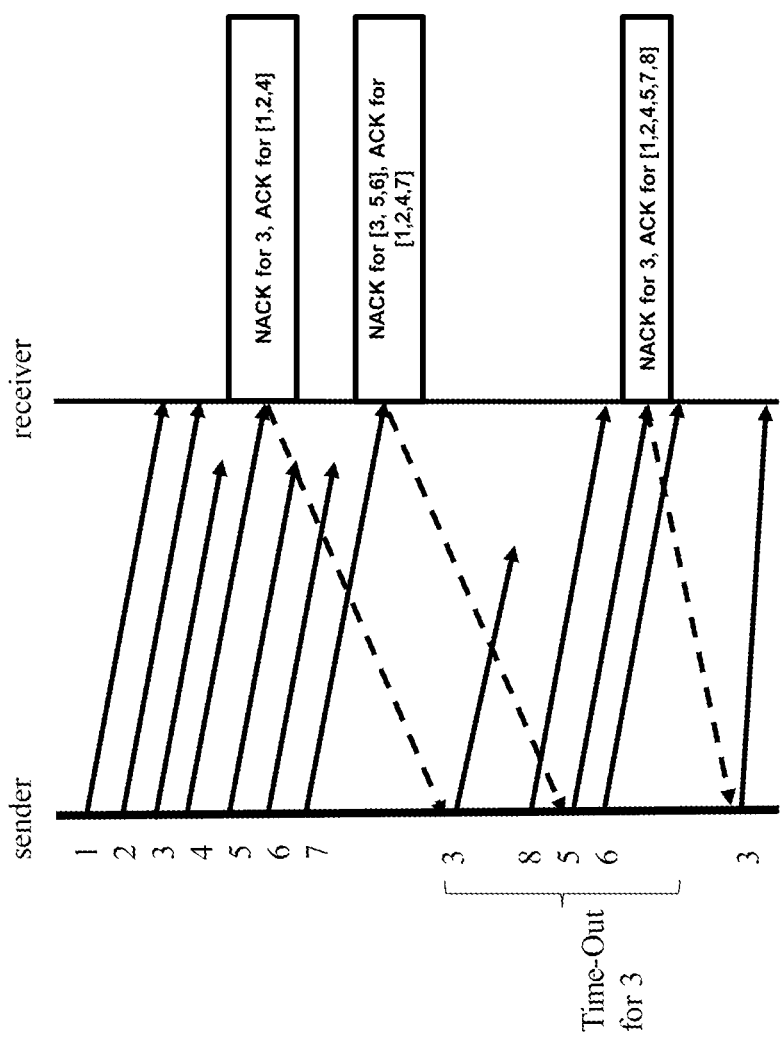
FIG. 5 shows an example of Selective-Repeat approach.

Further, the sender needs to know whether a retransmission of a previously NACKed packet (namely, the packet being indicated in a NACK) is also lost. A promising way to achieve that is to associate a logical timer with each retransmission. That is, if a particular retransmission is not ACKed (namely, the packet being indicated in a ACK) within a timeout period, it will be repeated. An example is shown in FIG. 5. It should be noted that, FIG. 5 does not show all the ACK messages that are sent or can be sent. The sender usually sends a NACK when it detects a new gap in the sequence number. The sender may send an ACK whenever it receives a data packet.

However, there are two problems with the above approach. First, it requires many logical timers. The operation of these timers is difficult, especially when implementing the protocol on hardware. Second, the protocol needs to adjust the time-out, which is a very difficult task. This is especially because that an RTT may vary very often in practice. Wrong estimation of the RTT may result either in an unnecessary retransmission (in case the time-out is too short), or in extra delay (in case the time-out is too long).

Checkpoint Mode (CPM) is a different approach for implementing Selective-Repeat. In particular, CPM uses three types of control messages: (1) poll messages, which are periodically sent by the sender; (2) status (STAT) messages, which are sent by the receiver as a response to the received POLL messages; and (3) unsolicited status (USTAT) messages, which are sent by the receiver whenever a new gap in the sequence numbers of the received data packets is detected.

Typically, the sender maintains two sequence number counters. The first counter is for the sequence numbers assigned to data packets. It is called message sequence number (MSN). The second counter is for sequence numbers assigned to poll messages. It is thus called poll message sequence number (PMSN).

When the sender sends a new data packet, it attaches to the new data packet a new MSN, and increments the MSN counter. If the receiver detects a new gap in the received data packets, it sends a USTAT message, and tells the sender what the detected gap is. The sender then resends the missing data packet(s) with its (their) original MSN. From time to time, a new poll message is created by the sender and sent to the receiver. A poll message is assigned a PMSN, which is equal to the PMSN of the last poll message+1. The poll message also contains a Max-MSN field, which is the MSN of the last new data packet transmitted.

When the sender sends a data packet, for the first time or as a retransmission, it associates the PMSN of the last sent poll message with the MSN of this packet. Such association may be kept in a memory of the sender.

When the receiver receives a poll message, it responds with a STAT message. The purpose of the STAT message is to inform the sender which of the data packets sent before the poll message have been correctly received and which of them have been lost. In general, the STAT message has three fields: (a) PMSN, which is copied from the poll message to which the STAT responds; (b) the Max-MSN value, which is also copied from the poll message; and (c) a list of data packets whose sequence numbers are smaller than Max-MSN and not received yet by the receiver.

Some retransmission rules of the protocol are stated in the following. Firstly, each USTAT message is always obeyed by the sender, namely, the sender retransmits the data packets reported missing by the USTAT message. This is to guarantee that, for each of these retransmitted data packets, which is received by the receiver, it will be the first time that the receiver receives this packet. Secondly, when a STAT message is received, for each data packet reported missing, the sender retransmits this packet if and only if the PMSN associated with this data packet is smaller than the PMSN associated with the poll/STAT handshake.

The above protocol is developed as a Layer 2 protocol, and it assumes that packets are received in-order. Under this assumption, the above retransmission rules guarantee that all data packets are eventually received by the receiver and that no packet is unnecessarily retransmitted by the sender.

Figure 6:
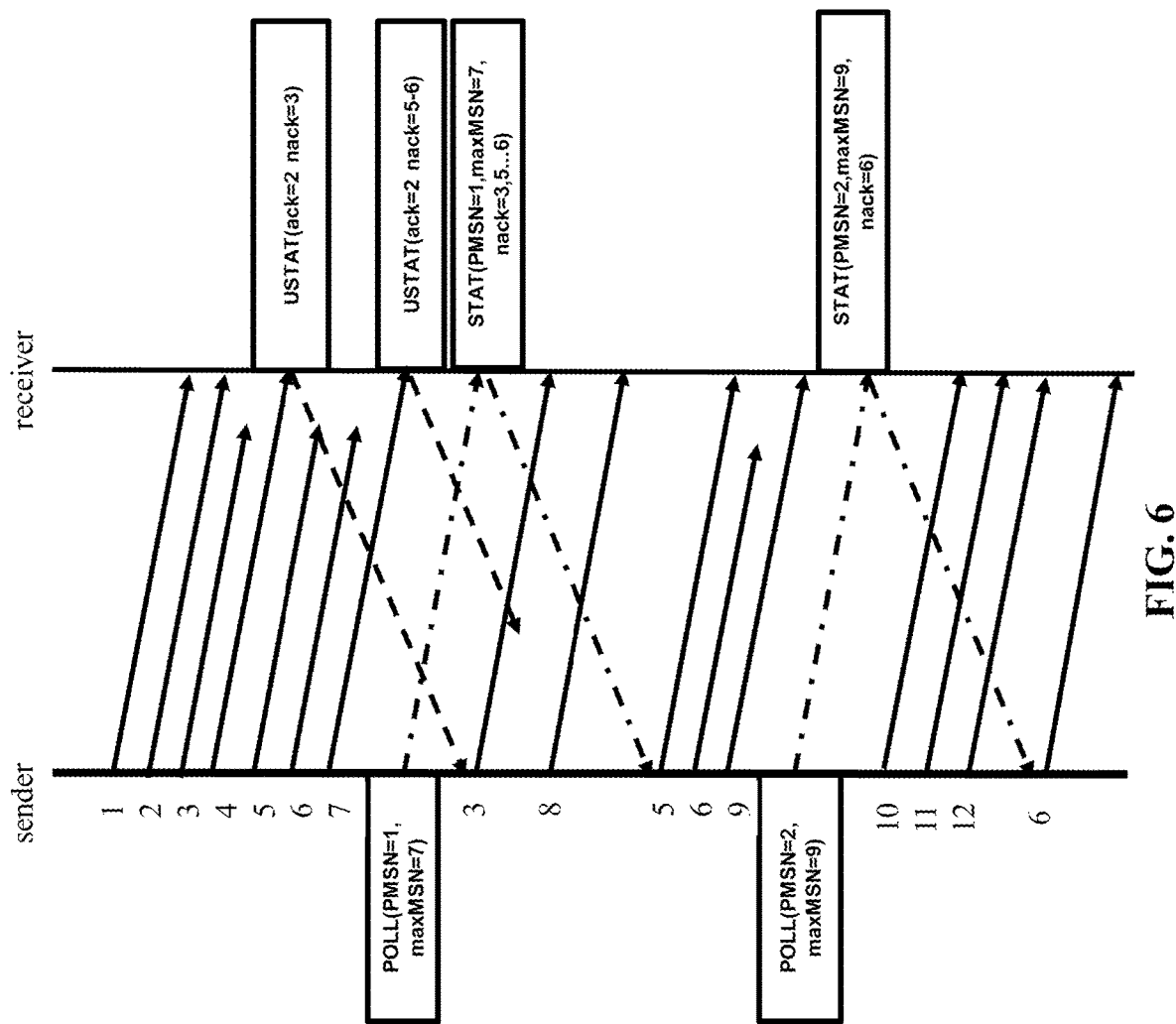
FIG. 6 shows an example of Checkpoint mode approach.

FIG. 6 shows an example of the CPM approach. In this example, USTAT messages are used not only for reporting about new gaps, but also for reporting data packets that are correctly accepted. For instance, packet 3 is lost, and a USTAT message reporting this loss is sent when the receiver receives packet 4. When the USTAT message is received, the sender immediately retransmits packet 3. On the other hand, the USTAT message reporting the loss of packets 5 and 6 is lost, and therefore these packets are retransmitted only after the next successful poll/STAT handshake.

The first poll message receives PMSN=1 and it requests the receiver to report missing packet until sequence number 7. When the STAT message responding to this poll message is received by the sender, the sender is waiting for ACKs regarding data packets 1-8. All these data packets are associated at the sender with PMSN=1 except 3 and 8 that have PMSN=2, because their last transmission took places after the first poll message was sent. This is shown by Table 1.

TABLE 1

| The status of the sender's window | | | | | | | | |
|---|---|---|---|---|---|---|---|---|
| Packet number (MSN) | 1 | 2 | 3 | 4 | 5 | 6 | 7 | 8 |
| PMSN | 1 | 1 | 2 | 1 | 1 | 1 | 1 | 2 |

When the STAT message responding to the first poll message is received by the sender, this STAT message reports that packets 3, 5 and 6 are missing. By comparing the PMSN of this STAT message (i.e., PMSN=1) to the PMSNs associated with data packets 3, 5 and 6 (i.e., 2, 1, and 1, respectively), the sender learns that the last transmission of data packet 3 took places after the transmission of the poll message to which this STAT message responds. This implies that this STAT message does not really indicate whether the last transmission of 3 was successful or not. Hence, the sender ignores the retransmission request for packet 3 (and, indeed, there is no need to retransmit this packet because the last transmission is correctly received), but it obeys the retransmission request for data packets 5 and 6.

The retransmission of data packet 6 is lost. But no USTAT is sent following this loss, because a USTAT is sent only for the first transmission of each data packet. Then, the sender continues sending new packets (e.g., packet 9). The second STAT message is sent when the largest MSN is 9. The responding STAT message indicates that packet 6 is still missing. By comparing the PMSN of the second STAT message (i.e., PMSN=2) to the PMSN associated with data packet 6 when the STAT message is received (i.e., PMSN=1), the sender learns that the last transmission has been lost, and it transmits this packet for the third time.

It can be seen that an important question when implementing the CPM approach is, when the sender should send a poll message. There is a clear trade-off here: if poll messages are sent too often, the processing burden on the sender and the receiver increases due to additional poll and STAT messages. Moreover, the bandwidth overhead increases as well. On the other hand, if poll messages are sent relatively rarely, it takes the sender a long time to know about data packets that must be retransmitted. This could significantly increase the time it takes to complete the transmission of a file.

In the state of art, two approaches have been proposed for sending poll messages: sending a poll message after N data packets; and sending a poll message every T time units. However, both of these approaches are static.

Figure 7:
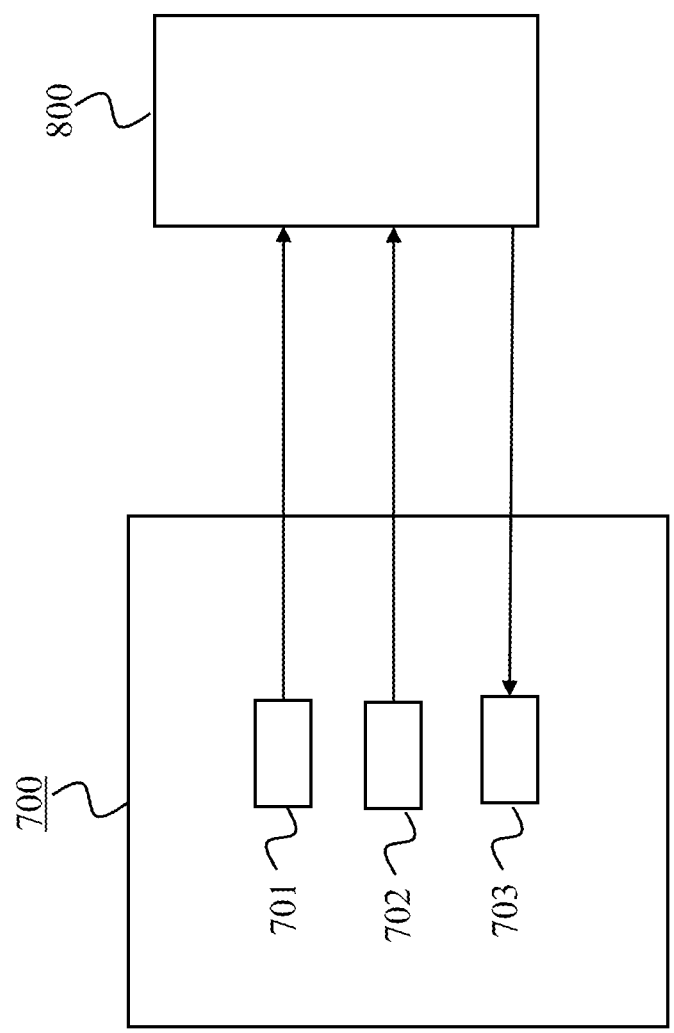
FIG. 7 shows a first network device according to an embodiment.

FIG. 7 shows a first network device 700 according to a disclosed embodiment. The first network device 700 may comprise processing circuitry configured to perform, conduct or initiate the various operations of the first network device 700 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The first network device 700 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network device 700 to be performed.

In one embodiment, the processing circuitry comprises one or more processors and a non-transitory memory connected to the one or more processors. The non-transitory memory may carry executable program code which, when executed by the one or more processors, causes the first network device 700 to perform, conduct or initiate the operations or methods described herein.

To address the aforementioned limitations and deficiencies, aspects of the disclosed embodiments propose dynamic approaches for sending poll messages, which allows the CPM to be efficiently used in modern datacenters, and especially for remote direct memory access (RDMA). Further, aspects of the disclosed embodiments also propose dynamic approaches for sending USTAT messages, particularly not only when the receiver identifies a new gap in the sequence number space.

In particular, the first network device 700 is configured to transmit data packets 701 to a second network device 800. Thus, the first network device 700 may be referred to as "sender" and the second network device 800 as "receiver", particularly in comparison with the sender and receiver shown in the previous figures. The first network device 700 is further configured to transmit poll messages 702 to the second network device 800. Then, the first network device 700 is configured to receive, in response to each poll message 702, at least one status message 703 from the second network device 800, the at least one status message 703 indicating which of the data packets 701 sent before that poll message 702 have been correctly received at the second network device 800 and/or have been lost. Further, the first network device 700 is particularly configured to adapt a rate of transmitting the poll messages 702 based on a set of parameters.

Aspects of the disclosed embodiments provide designs and rules regarding how to transmit the poll messages 702. In particular, it is proposed that the sender's algorithm will use either deterministic or probabilistic considerations. According to aspects of the disclosed embodiment, the first network device 700 as shown in FIG. 7, may be configured to adapt the rate of transmitting the poll messages 702 by performing a deterministic and/or probabilistic algorithm based on the set of parameters. This is in contrast to the algorithms used in the past which were deterministic.

Optionally, the first network device 700 may be configured to decide whether to transmit a poll message 702 after a given transmitted data packet based on the set of parameters. In particular, the set of parameters may comprise a probability parameter.

In a probabilistic algorithm, the first network device 700 may decide whether or not to send a poll message 702 after a certain data packet 701 using probabilistic considerations. The simplest probabilistic algorithm is to send a poll message 702 after each data packet with probability p, or to send it after every T time units with probability p. But a probabilistic algorithm can take into account more considerations, such as a relationship between poll rate (rate of sending the poll messages 702) and congestion, a relationship between poll rate and the sender proximity to end of transaction, and a relationship between poll rate and the sender proximity to end of its congestion-control and/or flow-control window.

As indicated above, a main role of poll messages 702 is to ask the receiver to report about missing packets 701. In modern datacenters, almost all missing packet 701 events are attributed to network congestion. Therefore, when there is high congestion, there are many lost packets, and the first network device 700 may increase the rate of sending the poll messages 702. On the other hand, when there is low congestion, it may be desired that the first network device 700 decreases the rate of sending the poll messages 702.

In modern datacenters, for each connection, the first network device 700, or any other sending node, may be informed about the congestion along the transmission path of its outgoing packets 701. This is done either by being informed about lost packets 701, or by being informed about early congestion using special control messages.

In aspects of the disclosed embodiment, the proposed algorithm may be that the first network device 700 will increase a rate of transmitting the poll messages 702 in high congestion and decrease it in low congestion. According to an aspect of the disclosed embodiment, the set of parameters may comprise a congestion parameter indicating a network congestion. Possibly, the set of parameters may comprise an RTT between the first network device 700 and the second network device 800.

Optionally, according to an embodiment, the first network device 700 may be configured to increase the rate of transmitting the poll messages 702, if the congestion parameter indicates a high network congestion. Alternatively, or additionally, the first network device 700 may be configured to decrease the rate of transmitting the poll messages 702, if the congestion parameter indicates a low network congestion.

Possibly, in this algorithm the rate of transmitting the poll messages 702 is proportional to the congestion, along the transmission path between the sender (first network device 700) and the receiver (second network device 800). That is, according to an aspect of the disclosed embodiment, the first network device 700 may be further configured to adapt the rate of transmitting the poll messages 702 proportionally to a network congestion along the transmission path between the first network device 700 and the second network device 800.

Another way to define this algorithm is that, the number of poll messages 702 is proportional to the percentage of packet loss. A third way is to say that the number of poll messages 702 is proportional to the probability that a packet 701 will be lost.

In general, the transmission by the first network device 700 can be viewed as a transmission of a series of transactions. This is, for example, the case in RDMA, where the sender may perform a series of WRITE operations, and each operation can be considered as a transaction (also called "Message").

In many cases, the second network device 800 cannot process the first packet of transaction i before it has received all the packets of transaction i−1. This is because in these cases all previous transactions must be successfully completed before the next one can start. Moreover, sometimes a receiver will have to drop all the packets of transaction i that are received before any packet from transaction i−1. This could result in a significant packet loss, because the receiver has to drop good packets, similarly to go-back-N.

In these cases, it may be beneficial for the first network device 700 to be aware of lost packets, when it is close to the end of a transaction, compared to when it is far from the end of a transaction. This is because when the first network device 700 is close to the end of a transaction, missing packets 701 can delay the transaction completion time.

According to an aspect of the disclosed embodiment, the set of parameters may comprise a first proximity parameter indicating a proximity of the transmitted data packets 701 to the end of a transaction, wherein the transaction comprises a plurality of data packets. Accordingly, the first network device 700 may be configured to increase the rate of transmitting the poll messages 702, if the first proximity parameter indicates that the data packets 701 are transmitted close to the end of the transaction.

Such algorithm, as this disclosure proposes, may be that the poll rate will be reverse proportional to the fraction of packets 701 remaining before the end of the transaction. As an example, the first network device 700 sends the poll messages 702 probabilistically, with a probability that equals to $(1-(N-i)/N)*\alpha$, where $\alpha<1$, for sending a poll message after the i data packet in a transaction that consists of N data packets 701.

Further, consider a first network device 700 sending data packets 1 . . . N, at a certain moment the first network device 700 receives an ACK for data packets 1-3 and N. At this time, the sender waits for an ACK for data packets 4 . . . N−1, but the "sender's window" contains packets [4 . . . N], namely all the packets 701, from the earliest one for which an ACK has not been received, to the latest one whether or not an ACK was or received for it. In this case, the width of the sender's (first network device's) window is N−3.

The width of such a sender window is used very often for flow control and for congestion control. In those cases, the sender is not allowed to have a window's width larger than a certain threshold. For example, if the largest window's width is N, then with the scenario considered above, the sender is allowed to send data packet N+1, N+2 and N+3, but not any additional data packet.

According to an aspect of the disclosed embodiment, the set of parameters may comprise a second proximity parameter indicating a proximity of the transmitted data packets 701 to the end of a transmission window of the first network device 700. Accordingly, the first network device 700 may be configured to increase the rate of transmitting the poll messages 702, if the second proximity parameter indicates that the data packets 701 are transmitted close to the end of the transmission window.

This algorithm with respect to the width of the window of the first network device 700 may be that more poll messages 702 are sent when the first network device 700 is closer to the end of its window. As an example, the first network device 700 sends the poll messages 702 probabilistically, with a probability that equals to $(1-(N-i)/N*\alpha$, where $\alpha<1$, for sending a poll message after the i data packet in a window for which the maximum width is N.

In an example, a rate of transmitting poll messages 702 is adaptively updated according to an equation: $P=Max\{\alpha*(\beta/W)*(p*\beta), C\}$, where p=a packet loss rate, B=a bandwidth-delay product, $p*\beta$=the mean number of packets 701 lost during an RTT, $\alpha$='aggressiveness' parameter, W=the minimum between the length of a sender window (of the first network device 700) and the length of a receiver window (of the second network device 800), C=the minimal number of poll messages 702 per RTT (constant), i.e. the poll rate when there is no packet loss, P=number of poll messages sent per RTT.

In can be noted that, the number P of poll messages 702 sent during an RTT is proportional to the expected number of lost data packets during an RTT. The proportionality constant is equal to $\alpha*R$, where R is the ratio between the total number of data packets the sender can transmit during an RTT, namely $\beta$, and the actual length of the sender's window. $\beta$ is either a fixed number, or it dynamically changes according to congestion control information.

When the above ratio R is smaller than 1, the sender window is long enough to take advantage of the available bandwidth even if data packets 701 are lost and therefore cannot be removed from the window. Hence, there is no need to send poll messages 702 too often. When the ratio R is greater than 1, the sender window is short compared to the available bandwidth. This implies that if lost packets 701 are not recovered as early as possible, the first network device 700 will have to stop sending new data packets 701 and bandwidth will not be efficiently utilized.

The aggressiveness parameter a typically ranges between 0.1 and 10, with a default value of 1. Its value depends on how important is the connection (in terms of the desire to minimize its delay), and on how close the connection is to the end. When the connection is more important and when the sender is close to the end of application layer data ("end of file"), the value of $\alpha$ increases beyond 1, and vice versa.

Figure 8:
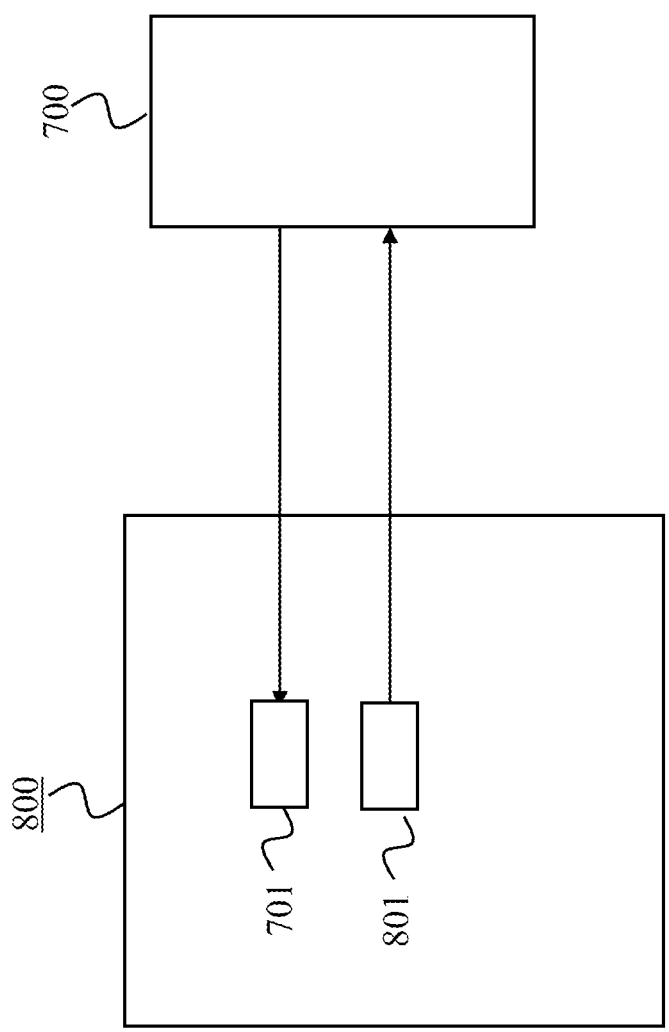
FIG. 8 shows a second network device according to an embodiment.

FIG. 8 shows a second network device 800 according to an aspect of the disclosed embodiment. In particular, the second network device 800 is configured to receive data packets 701 from a first network device 700. Thus, the second network device 800 may be referred to as "receiver" and the first network device 700 as "sender", particularly in comparison with the sender and receiver shown in the previous figures. Further, the second network device 800 is configured to transmit at least one USTAT message 801 to the first network device 700, in case of one or more of the following conditions: the second network device 800 identifies a new congestion control event, the second network device 800 did not receive a poll message for a determined amount of time, and the second network device 800 received all data packets of a transaction. Possibly, the first network device 700 is the first network device as shown in FIG. 7.

Aspects of the disclosed embodiments also propose to use USTAT messages 801 for conveying other important information to the first network device 700, and not only when a new sequence number gap is detected, but also in at least one of the following events.

When the receiver wants to inform the first network device 700 about a new congestion control event, the second network device 800 may decide to send a USTAT message 801 to the sender, i.e., the first network device 700. For example, if the second network device 800 receives a data packet 701 correctly, but this packet indicates that one of the switches along the path was congested.

Possibly, according to an aspect of the disclosed embodiment, the congestion control event comprises a network congestion along the transmission path between the first network device 700 and the second network device 800.

When the receiver did not receive a poll message 702 for a considerably long time, the receiver, i.e., the second network device 800, can send a USTAT message 801 and tell the first network device 700 the maximum sequence number of data packets 701 received in order. For example, the second network device 800 receives data packets 1, 2, 3 and 5. Upon receiving packet 5, CPM requires the receiver to send a USTAT message that informs the sender that packet 4 is missing. Later, if the second network device 800 does not receive a poll message for a long time (e.g., longer than a timeout), it sends a USTAT message 801 telling the first network device 700 that the maximum sequence number of packets 701 received in order is 3.

Optionally, if the second network device 800 did not receive a poll message for the determined amount of time, the second network device 800 is configured to include a maximum sequence number of data packets received in order in the at least one USTAT message 801.

As mentioned before, in many cases the transmission by the first network device 700 can be considered as a transmission of a series of transactions. In these cases, it is beneficial for the first network device 700 to know that the second network device 800 has received all the packets 701 of the transaction. One option is to send a poll message 702 after the last data packet 701 of the considered transaction, but this poll message 702 can be lost. Therefore, the second network device 800 can send a USTAT message 801 upon receiving all the data packets 701 of the transaction.

Optionally, according to an aspect of the disclosed embodiment, the second network device 800 may also be configured to transmit at least one USTAT message 801 to the first network device 700, if detecting that one or more data packets were not received. Notably, this refers to a conventional way for sending a USTAT message.

Optionally, according to an aspect of the disclosed embodiment, if the second network device 800 did not receive a poll message 702 for the determined amount of time, the second network device 800 may be configured to include packets acceptance information, such as a bitmap, a table or any other way, which can indicate the status of one or more packets 701 that were received and/or one or more packets 701 that were not received, in the at least one USTAT message 801.

It should be noted that, with respect to poll messages, in existing solutions the sender polls the peer endpoint in a static manner. This property results from the fact that existing solutions were applied to Layer 2 networks, in which the delay is constant and packets are delivered in order.

Aspect of the disclosed embodiments provides solutions that the first network device 700 adaptively polls the peer endpoint according to the system behavior. Notably, this difference generalizes the protocol and makes it applicable to larger networks, in which the delay is variable and packets are not necessarily delivered in order.

With respect to USTAT messages, in existing solutions the receiver sends these messages only to report about a new gap in the sequence number or to inform about a flow control event. According to this disclosure, the USTAT messages 801 can be used for other events as well.

The approaches described in aspect of the disclosed embodiments make use of poll messages 702, STAT, and USTAT messages 801. Alternatively, these messages may be piggybacked onto data packets 701, and do not have to be separate messages. In addition, it is possible to use a subset of these messages rather than to use all three types of messages (for example, it is possible to use poll messages 702 and STAT messages and not to use USTAT messages 801).

Notably, traffic is bidirectional, and thus each endpoint is both a sender and a receiver. Possibly, the first network device 700 shown in FIG. 7 may be the second network device 800 shown in FIG. 8 in an exemplary implementation.

Figure 9:
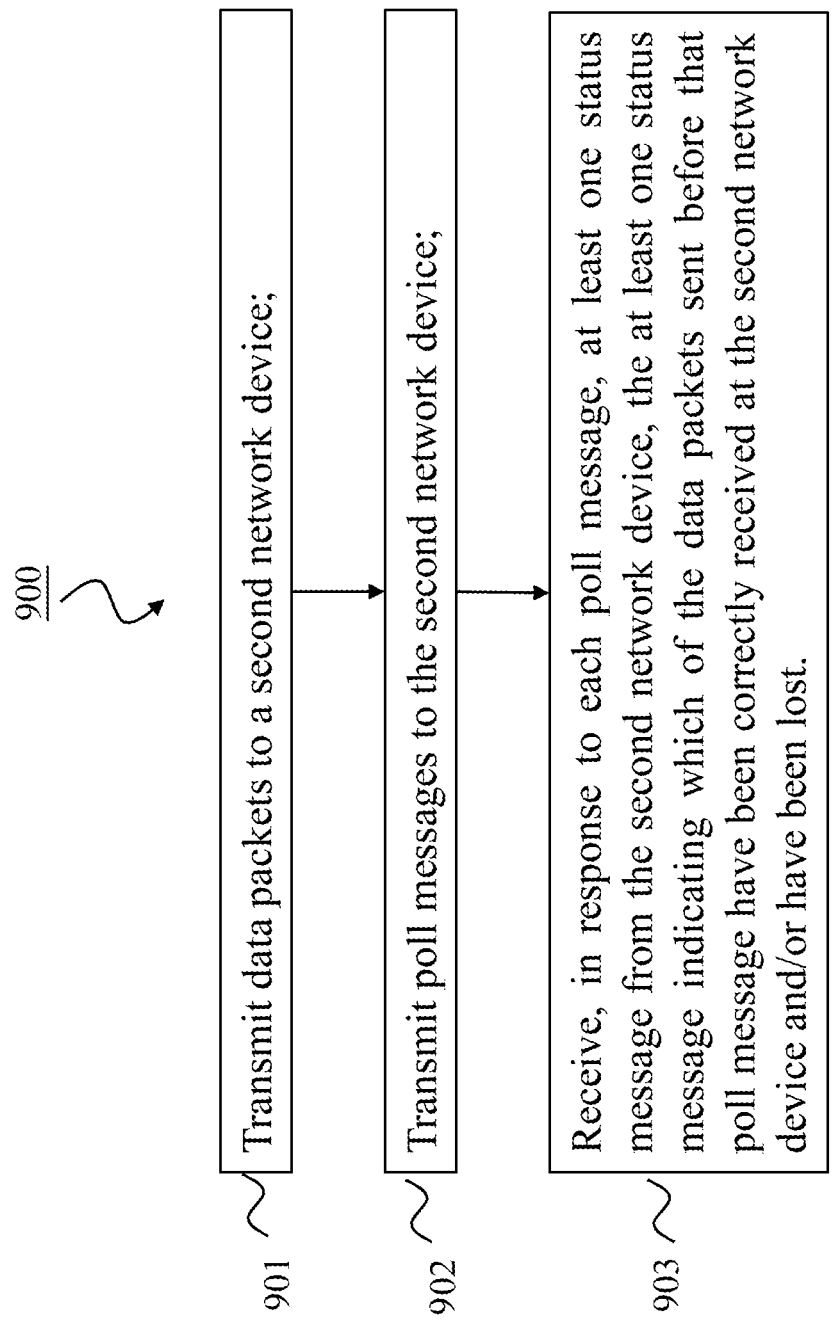
FIG. 9 shows a method according to an embodiment.

FIG. 9 shows a method 900 according to an aspect of the disclosed embodiment. In a particular aspect of the disclosed embodiment, the method 900 is performed by a first network device 700 shown in FIG. 7. The method 900 comprises: a step 901 of transmitting data packets 701 to a second network device 800; a step 902 of transmitting poll messages 702 to the second network device 800; and a step 903 of receiving, in response to each poll message 702, at least one status message 703 from the second network device 800, the at least one status message 703 indicating which of the data packets 701 sent before that poll message 702 have been correctly received at the second network device 800 and/or have been lost; wherein the first network device 700 is configured to adapt a rate of transmitting the poll messages 702 based on a set of parameters. Possibly, the second network device 800 is the second network device shown in FIG. 7 or FIG. 8.

FIG. 10 shows a method 1000 according to an aspect of the disclosed embodiment. In a particular aspect of the disclosed embodiment, the method 1000 is performed by a second network device 800 shown in FIG. 8. The method 1000 comprises: a step 1001 of receiving data packets 701 from a first network device 700; and a step 1002 of transmitting at least one USTAT message 801 to the first network device 700, in case of one or more of the following conditions: the second network device 800 identifies a new congestion control event, the second network device 800 did not receive a poll message for a determined amount of time, and the second network device 800 received all data packets of a transaction. Possibly, the first network device 700 is the first network device shown in FIG. 7 or FIG. 8.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to aspects of the disclosed embodiments may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network device 700 and the second network device 800, respectively, comprises the necessary communication capabilities in the form of, e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the first network device 700 and the second network device 800, respectively, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A first network device, the first network device being configured to:
   transmit data packets to a second network device;
   transmit poll messages to the second network device; and
   receive, in response to each of the poll messages, at least one status message from the second network device, the at least one status message indicating which of the data packets sent before a corresponding one of the poll messages have been correctly received at the second network device or have been lost;
   wherein the first network device is configured to adapt a rate of transmitting the poll messages based on a set of parameters,
   wherein the set of parameters comprises a first proximity parameter indicating a proximity of the transmitted data packets to an end of a transaction, wherein the transaction comprises a plurality of the data packets, and
   wherein the first network device is further configured to increase the rate of transmitting the poll messages upon determining that the first proximity parameter indicates that the data packets are transmitted close to the end of the transaction.

2. The first network device according to claim 1, wherein:
   the first network device is configured to adapt the rate of transmitting the poll messages by performing a deterministic or probabilistic algorithm based on the set of parameters.

3. The first network device according to claim 1, configured to:
   decide whether to transmit a poll message, of the poll messages, after a given transmitted data packet, of the transmitted data packets, based on the set of parameters.

4. The first network device according to claim 3, wherein:
   the set of parameters comprises a probability parameter.

5. The first network device according to claim 4, wherein:
   the set of parameters comprises a congestion parameter indicating a network congestion.

6. The first network device according to claim 1, wherein:
   the set of parameters comprises a round trip time between the first network device and the second network device.

7. The first network device according to claim 5, configured to:
   increase the rate of transmitting the poll messages, upon determining that the congestion parameter indicates a high network congestion; or
   decrease the rate of transmitting the poll messages, upon determining that the congestion parameter indicates a low network congestion.

8. The first network device according to claim 5, configured to:
   adapt the rate of transmitting the poll messages proportionally to a network congestion along the transmission path between the first network device and the second network device.

9. The first network device according to claim 1, wherein:
   the set of parameters comprises a second proximity parameter indicating a proximity of the transmitted data packets to an end of a transmission window of the first network device.

10. The first network device according to claim 9, configured to:
    increase the rate of transmitting the poll messages, upon determining that the second proximity parameter indicates that the data packets are transmitted close to the end of the transmission window.

11. The first network device according to claim 1, wherein:
    the poll messages are transmitted piggybacked onto the data packets to the second network device.

12. A system comprising the first network device according to claim 1 and a second network device, the second network device being configured to:
    receive data packets from the first network device; and
    transmit at least one unsolicited status message to the first network device, upon determining one or more of the following conditions have occurred:
      the second network device identifies a new congestion control event,
      the second network device did not receive a poll message for a determined amount of time,
      the second network device received all of the data packets of a transaction.

13. The system according to claim 12, further configured to:
    transmit at least one unsolicited status message to the first network device, upon detecting that one or more data packets were not received.

14. The system according to claim 12, wherein the congestion control event comprises a network congestion along the transmission path between the first network device and the second network device.

15. The system according to claim 12, wherein the second network device is configured such that:
    upon determining that the second network device did not receive the poll message for the determined amount of time, t a maximum sequence number of data packets received in order is included in the at least one unsolicited status message.

16. The system according to claim 12, wherein the second network device is configured such that:
    upon determining that the second network device did not receive the poll message for the determined amount of time, packets acceptance information, which indicates a status of one or more packets that were received or one or more packets that were not received, is included in the at least one unsolicited status message.

17. A method performed in a system, the method comprising the method performed by the first network device according to claim 1, and a complementary method performed by a second network device, the complementary method comprising:
    receiving data packets from a first network device; and
    transmitting at least one unsolicited status message to the first network device, upon one or more of the following conditions:
      the second network device identifies a new congestion control event,
      the second network device did not receive a poll message for a determined amount of time, or
      the second network device received all data packets of a transaction.

18. A method performed by a first network device, the method comprising:
    transmitting data packets to a second network device;
    transmitting poll messages to the second network device; and
    receiving, in response to each of the poll messages, at least one status message from the second network device, the at least one status message indicating which of the data packets sent before a corresponding one of the poll message have been correctly received at the second network device or have been lost;

wherein the first network device is configured to adapt a rate of transmitting the poll messages based on a set of parameters, wherein the set of parameters comprises a first proximity parameter indicating a proximity of the transmitted data packets to an end of a transaction, wherein the transaction comprises a plurality of the data packets, and wherein the method further comprises increasing the rate of transmitting the poll messages upon determining that the first proximity parameter indicates that the data packets are transmitted close to the end of the transaction.

19. A non-transitory computer readable medium comprising a program code for performing, when running on a computer, the method according to claim 18.

* * * * *